July 6, 1948. R. E. GIBBES 2,444,772
DRINKING APPLIANCE FOR BIRDS AND ANIMALS
Filed Feb. 4, 1947
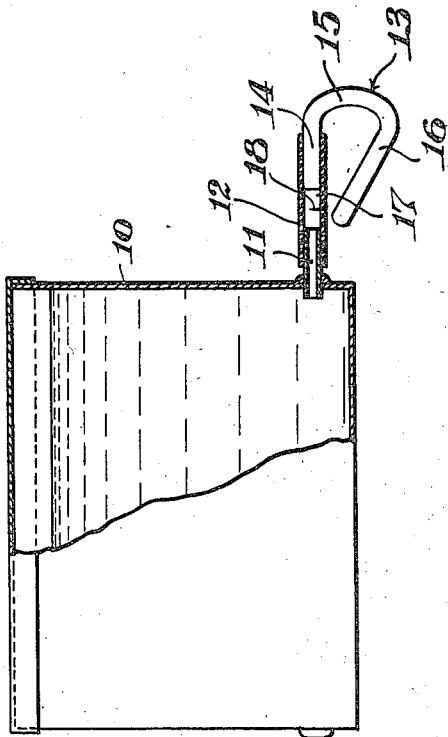
Fig. 1.
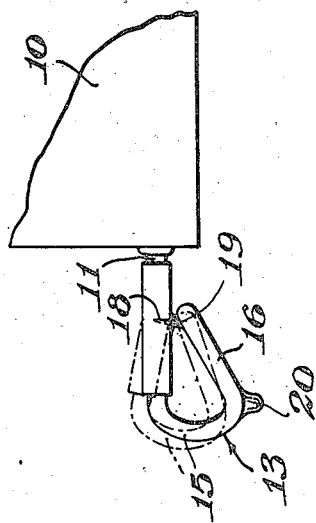
Fig. 3.
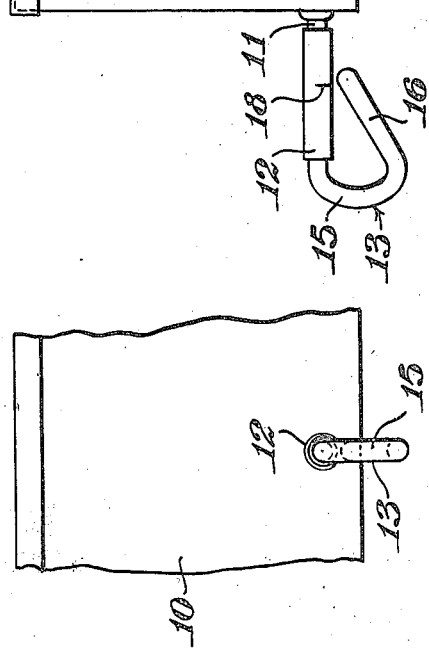
Fig. 2.
INVENTOR.
RONALD E. GIBBES
By 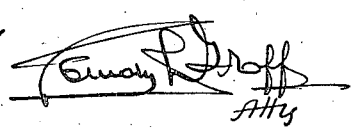
Atty Patented July 6, 1948

2,444,772

UNITED STATES PATENT OFFICE 2,444,772

DRINKING APPLIANCE FOR BIRDS AND ANIMALS

Ronald Edward Gibbes, Weedon, England

Application February 4, 1947, Serial No. 726,272
In Great Britain September 3, 1946

5 Claims. (Cl. 119—72.5)

This invention relates to a new or improved drinking appliance for birds and animals and provides means of a simple nature for supplying water or liquid foods under the control of means manipulated by a bird or animal by a natural movement of the head in reaching for the water or other liquid. The water or other liquid is consumed immediately on delivery so that hygienic conditions are ensured, and the cleaning out of reservoirs and the like is obviated.

According to the invention there is provided a liquid controlling and delivery appliance for use in association with a container, said appliance comprising a resilient but self-sustaining tube having a transverse cut which normally is maintained substantially closed, whereby a portion of the tube is capable of displacement to open the slit, said portion having a closed outer end, and means associated with said displaceable portion to form a drip runway and dripping point for delivered liquid and which is readily operable by the head of a bird or animal to displace the said portion of the tube.

One embodiment of the invention is illustrated in the accompanying drawings, in which:

Figure 1 is a front elevation of the device partly in section,

Figure 2 is a side elevation corresponding to Figure 1, and

Figure 3 is a front elevation showing the manner of operation of the device.

The apparatus comprises a container 10 for the liquid. A short length of rigid tubing 11 is fitted into the wall of the container 10 near the bottom thereof so as to communicate with the interior of the container. A resilient tube 12, for example one made of stout rubber, is fitted at one end over the outer portion of the tubing 11 so as to make a tight fit thereon. In the free outer end of the tube 12 there is securely fitted a short length of stout wire or rod 13 which is so shaped that when in position it consists of a horizontal portion 14 secured into the tube 12, a downwardly extending portion 15, and an upwardly inclined portion 16. The tubing 11 and the wire or rod 13 do not contact each other within the tube 12, so that there remains a portion 17 of the tube 12 which is unobstructed by rigid members. In the portion 17 is formed a transverse cut 18 extending for substantially the lower half of the circumference of the tube. It will be seen that the wire or rod 13 terminates at a position immediately beneath the transverse cut 18.

In the normal condition of the appliance the wire or rod 13 serves as a weight to assist in maintaining the cut in the tube substantially closed. Slight seeping of liquid takes place by way of the closed cut as indicated at 19 in Figure 3 and the slowly seeping liquid passes through the cut and runs down the inclined portion 16 of the wire or rod to form a drip 20 at the bottom apex of same. A bird or animal requiring to partake of the liquid will consume the depending drip, and in seeking more will press against or agitate the wire or rod with the result that the wire or rod will be momentarily raised and will raise with it the outer portion of the tube, as indicated in broken lines in Figure 3, said outer portion flexing about the cut to open same and cause liquid freely to escape and flow down the wire or rod, the liquid being consumed as it is thus delivered. The apparatus will generally be mounted at such a height that the bird or animal will reach upwards to it, so that the lifting of the wire or rod will be a natural operation.

It will be appreciated that the appliance is capable of cheap and easy production and is devoid of mechanical parts liable to give trouble. No attention is required to keep the apparatus in use, other than refilling of the container, the latter being provided with a suitable cover for excluding foreign matter. The container may be provided with any desired number of the delivery devices disposed at different positions. Thus, a number of the delivery devices may be provided on a common tube communicating with the container and leading to battery cages.

If desired, the whole of the delivery device, with the exception of the actual drinking point, may be protected by means of a cover.

I claim:

1. A liquid controlling and delivery appliance for use in association with a container, comprising a resilient but self-sustaining tube having a transverse cut which normally is maintained substantially closed, whereby a portion of the tube is capable of displacement to open the slit, said portion having a closed outer end, and means associated with said displaceable portion to form a drip runway and dripping point for delivered liquid and which is readily operable by the head of a bird or animal to displace the said portion of the tube.

2. A liquid controlling and delivery appliance according to claim 1, wherein the means associated with the displaceable portion of the resilient tube consists of a rod which is so shaped that it extends downwardly and then inclines upwardly from a bottom apex to a position below and close to said cut in the tube.

3. Liquid controlling and delivery apparatus, comprising a container, a rigid tube extending from and in communication with said container at a position to allow liquid to flow from said container into said tube, a resilient tube fitted over the outer end of said rigid tube, said resilient tube having a transverse cut in the lower longitudinal part thereof and situated intermediately in the length thereof, and a rod making a close fit within the outer end of said resilient tube and so shaped that it comprises a portion extending downwardly from a position immediately beneath the transverse cut in said resilient tube.

4. Liquid controlling and delivery apparatus according to claim 3, wherein said rod extends downwardly from said resilient tube and then inclines upwardly from a bottom apex to reach a position below and close to the cut in said resilient tube.

5. Liquid controlling and delivery apparatus according to claim 3, wherein said resilient tube comprises an inner part which is occupied by the outer end of said rigid tube, an outer part within which is accommodated one end of said rod, and an intermediate unobstructed part in which said cut is formed.

RONALD EDWARD GIBBES.